US012454603B2

(12) United States Patent
Misumi et al.

(10) Patent No.: US 12,454,603 B2
(45) Date of Patent: Oct. 28, 2025

(54) PREPREG, LAMINATE, AND INTEGRATED PRODUCT

(71) Applicant: Toray Industries, Inc., Tokyo (JP)

(72) Inventors: Jun Misumi, Ehime (JP); Masato Honma, Ehime (JP); Kyoko Shinohara, Ehime (JP); Koji Furukawa, Ehime (JP); Atsuhito Arai, Ehime (JP)

(73) Assignee: Toray Industries, Inc., Tokyo (JP)

( * ) Notice: Subject to any disclaimer, the term of this patent is extended or adjusted under 35 U.S.C. 154(b) by 589 days.

(21) Appl. No.: 17/781,845

(22) PCT Filed: Nov. 20, 2020

(86) PCT No.: PCT/JP2020/043339
§ 371 (c)(1),
(2) Date: Jun. 2, 2022

(87) PCT Pub. No.: WO2021/117465
PCT Pub. Date: Jun. 17, 2021

(65) Prior Publication Data
US 2023/0017689 A1 Jan. 19, 2023

(30) Foreign Application Priority Data
Dec. 11, 2019 (JP) .................. 2019-223482

(51) Int. Cl.
*C08J 5/24* (2006.01)
*B32B 5/26* (2006.01)
*B32B 27/12* (2006.01)
*B32B 27/38* (2006.01)

(52) U.S. Cl.
CPC ............... *C08J 5/243* (2021.05); *B32B 5/26* (2013.01); *B32B 27/12* (2013.01); *B32B 27/38* (2013.01); *B32B 2260/046* (2013.01); *B32B 2262/106* (2013.01); *B32B 2305/72* (2013.01); *C08J 2363/00* (2013.01)

(58) Field of Classification Search
CPC ........ C08J 5/243; C08J 2363/00; B32B 5/26; B32B 27/12; B32B 27/38; B32B 2260/046; B32B 2262/106; B32B 2305/72
See application file for complete search history.

(56) References Cited

U.S. PATENT DOCUMENTS

| | | | |
|---|---|---|---|
| 8,092,897 B2 | 1/2012 | Honma et al. | |
| 10,344,132 B2 | 7/2019 | Misumi et al. | |
| 11,001,033 B2 | 5/2021 | Hatanaka et al. | |
| 2006/0110599 A1* | 5/2006 | Honma | B32B 5/24 428/522 |
| 2009/0130379 A1* | 5/2009 | Kousaka | B32B 5/24 428/116 |
| 2014/0087178 A1 | 3/2014 | Arai et al. | |
| 2018/0326677 A1 | 11/2018 | Taketa et al. | |
| 2019/0210301 A1 | 7/2019 | Naito et al. | |
| 2019/0225764 A1 | 7/2019 | Harada et al. | |
| 2019/0330433 A1* | 10/2019 | Kobayashi | C08L 63/00 |
| 2020/0056005 A1 | 2/2020 | Arai et al. | |

FOREIGN PATENT DOCUMENTS

| | | |
|---|---|---|
| CN | 103429371 A | 12/2013 |
| CN | 108291010 A | 7/2018 |
| CN | 108291044 A | 7/2018 |
| CN | 109952182 A | 6/2019 |
| CN | 110446745 A | 11/2019 |
| EP | 1 731 553 A1 | 12/2006 |
| EP | 2 949 689 A1 | 12/2015 |
| EP | 3 409 706 A1 | 12/2018 |
| JP | 08259713 A | 10/1996 |
| JP | 10138354 A | 5/1998 |
| JP | 3906319 B2 | 4/2007 |
| JP | 2017-119432 A | 7/2017 |
| JP | 2017183227 A | 10/2017 |
| JP | 2018161801 A | 10/2018 |
| JP | 2019038939 A | 3/2019 |
| WO | 2004/060658 A1 | 7/2004 |

(Continued)

OTHER PUBLICATIONS

Office Action (The First Office Action) issued Oct. 19, 2023, by the State Intellectual Property Office of People's Republic of China in corresponding Chinese Patent Application No. 202080083319.9 and an English translation of the Office Action. (11 pages).
The extended European Search Report issued Nov. 28, 2023, by the European Patent Office in corresponding European Patent Application No. 20900649. (18 pages).
Office Action issued Jan. 15, 2024, by the Taiwan Patent Office in corresponding Taiwanese Patent Application No. 109140770 and an English machine translation of the Office Action. (22 pages).
International Search Report and Written Opinion for International Application No. PCT/JP2020/043339, dated Feb. 2, 2021, 8 pages.

*Primary Examiner* — Callie E Shosho
*Assistant Examiner* — Bethany M Miller
(74) *Attorney, Agent, or Firm* — Buchanan Ingersoll & Rooney PC (57) ABSTRACT

A prepreg includes composition elements [A], [B], and [C] described below,
  [A] a reinforcing fiber,
  [B] a thermosetting resin, and
  [C] a thermoplastic resin. [C] is present on a surface of the prepreg, [B] contains a first curing agent [b1] and a second curing agent [b2], and the reinforcing fiber of [A] that crosses over a boundary surface between a resin region containing [B] and a resin region containing [C] and that is in contact with both resin regions is present.

10 Claims, 3 Drawing Sheets

(56) References Cited

FOREIGN PATENT DOCUMENTS

| WO | 2017130659 A1 | 8/2017 | | |
|---|---|---|---|---|
| WO | 2018003694 A1 | 1/2018 | | |
| WO | 2018079475 A1 | 5/2018 | | |
| WO | WO-2018135594 A1 * | 7/2018 | ............. | C08G 59/28 |
| WO | 2018173953 A1 | 9/2018 | | |

* cited by examiner

PREPREG, LAMINATE, AND INTEGRATED PRODUCT

CROSS REFERENCE TO RELATED APPLICATIONS

This is the U.S. National Phase application of PCT/JP2020/043339, filed Nov. 20, 2020, which claims priority to Japanese Patent Application No. 2019-223482, filed Dec. 11, 2019, the disclosures of each of these applications being incorporated herein by reference in their entireties for all purposes.

FIELD OF THE INVENTION

The present invention relates to a prepreg in which a thermosetting resin and a thermoplastic resin are impregnated into a reinforcing fiber, and to a laminate or an integrated product containing the thermosetting resin, the thermoplastic resin, and the reinforcing fiber.

BACKGROUND OF THE INVENTION

A fiber-reinforced composite material that combines a thermosetting resin or a thermoplastic resin as a matrix with a reinforcing fiber such as a carbon fiber and a glass fiber is a lightweight material yet having excellent mechanical properties such as strength and rigidity, as well as excellent heat resistance and corrosion resistance. Therefore, this has been used in numerous fields, including aerospace, automobiles, railway vehicles, marine vessels, civil engineering and construction, and sporting goods. However, these fiber-reinforced composite materials are not suitable for manufacturing of a part and a structural body having a complex shape in a single molding process. For the applications described above, it is necessary to prepare a member made of a fiber-reinforced composite material and then to integrate this with a similar or different type of a member. A mechanical bonding method using a bolt, a rivet, a screw, or the like, and a bonding method using an adhesive are used to integrate a fiber-reinforced composite material composed of a reinforcing fiber and a thermosetting resin with a similar or a different member. The mechanical bonding method requires a pre-processing process of a bonding portion, such as drilling of a hole, which leads to not only the increase in the time in the manufacturing process and in the manufacturing cost, but also the decrease in the material strength due to drilling of the hole. The bonding method using an adhesive requires bonding and curing processes, which include preparation and application of the adhesive; thus, this leads to the increase in the time in the manufacturing process and to the insufficient reliability in terms of the adhesion strength.

The fiber-reinforced composite material using a thermoplastic resin as the matrix bonds between members by welding in addition to the mechanical bonding method and the bonding method using an adhesive as described above; thus, it is possible to reduce the time necessary for bonding between members. On the other hand, when mechanical properties at a high temperature and an excellent resistance to chemicals are required as in the case of an aircraft structural member, there has been a problem in that the heat resistance and the chemical resistance thereof were not so good as those of the fiber-reinforced composite material composed of a thermosetting resin and a reinforcing fiber.

Here, Patent Literature 1 describes a method for bonding a fiber-reinforced composite material composed of a thermosetting resin and a reinforcing fiber via an adhesive.

Patent Literature 2 describes a method for integrating a member formed of a thermoplastic resin with a member formed of a fiber-reinforced composite material that is obtained from a thermosetting resin. Specifically, a thermoplastic resin film is laminated to the surface of a prepreg sheet composed of a reinforcing fiber and the thermosetting resin, and then, this is heated and pressurized to obtain a fiber-reinforced composite material. The resulting fiber-reinforced composite material is then placed in a mold, and then, the thermoplastic resin is injection molded to bond the thermoplastic resin member formed by injection molding with the fiber-reinforced composite material.

In addition, Patent Literature 3 describes a method for manufacturing a laminate in which a thermoplastic resin adhesive layer is formed on the surface of a composite material composed of a thermosetting resin and a reinforcing fiber. It is described that this shows the adhesive effect with other members via a thermoplastic resin.

Patent Literature 4 describes a prepreg and its fiber-reinforced composite material, in which a particle, or a fiber, or a film formed of a thermoplastic resin is placed on the surface layer of a prepreg composed of a reinforcing fiber and a thermosetting resin.

PATENT LITERATURE

Patent Literature 1: Japanese Patent Application Laid-open No. 2018-161801
Patent Literature 2: Japanese Patent Application Laid-open No. H10-138354
Patent Literature 3: Japanese Patent No. 3906319
Patent Literature 4: Japanese Patent Application Laid-open No. H08-259713

SUMMARY OF THE INVENTION

However, the method described in Patent Literature 1 is a method for bonding fiber-reinforced composite materials composed of a reinforcing fiber and a thermosetting resin to each other by using an adhesive; but, because the thermosetting resin is a matrix resin, welding cannot be used as the method for bonding the fiber-reinforced composite material as it is. Because it takes a time for the adhesive to be cured, there is a problem in that the bonding process is time-consuming. On top of this, the bonding strength thereof was not sufficient.

In the method described in Patent Literature 2, the bonding strength at the bonding portion between the thermosetting resin in the fiber-reinforced composite material and the thermoplastic resin film was not sufficient.

The fiber-reinforced composite material of Patent Literature 3 could be integrated by welding via the thermoplastic resin and exhibited an excellent bonding strength at room temperature, but the bonding strength at high temperature was not sufficient.

In the method described in Patent Literature 4, it is indicated that the particle, the fiber, or the film made of the thermoplastic resin improves an interlaminar fracture toughness value, but the bonding strength in the boundary portion between the thermosetting resin in the fiber-reinforced composite material and the thermoplastic resin was not sufficient.

An object of the present invention is thus to provide: a prepreg giving a laminate suitable as a structural material, the prepreg having an excellent reactivity as a prepreg, being capable of shortening the molding time of a member, having an excellent dimensional accuracy of a molded member, being capable of bonding members of the same or different types by welding, expressing an excellent bonding strength, and having an excellent interlaminar fracture toughness value; and a laminate and an integrated product thereof.

To solve the problem described above, a prepreg according to embodiments of the present invention includes the following compositions. That is, the prepreg includes composition elements [A], [B], and [C] described below,

[A] a reinforcing fiber,
[B] a thermosetting resin, and
[C] a thermoplastic resin.
[C] is present on a surface of the prepreg, [B] contains a first curing agent [b1] and a second curing agent [b2], and the reinforcing fiber [A] that crosses over a boundary surface between a resin region containing [B] and a resin region containing [C] and that is in contact with both resin regions is present.

Furthermore, the laminate, which is another aspect of the present invention, has any of the following compositions. That is, the laminate includes the composition in which the cured product of the above-described prepreg constitutes at least some of the layers, or includes the following composition. That is, the laminate includes a layer containing the following composition elements [A], [C], and [D],

[A] a reinforced fiber;
[C] a thermoplastic resin; and
[D] a thermosetting resin cured product formed by curing a thermosetting resin containing a first curing agent [b1] and a second curing agent [b2].

The reinforcing fiber [A] that crosses over a boundary surface between a resin region containing [C] and a resin region containing [D] and is in contact with both resin regions is present.

Here, whenever the term "laminate" is used in this specification, this shall refer to any of these laminates in accordance with the context unless otherwise specifically mentioned. Also, without any particular restriction, as it can be seen from this specification, the laminate according to embodiments of the present invention is a fiber-reinforced resin that can be typically prepared by using a preform containing the prepreg of the present invention.

The prepreg and the laminate according to the present invention use a thermosetting resin and a thermoplastic resin, and these two are firmly bonded; and in addition, they can well weld with the same or a different member. Accordingly, the time required for the bonding process can be shortened as compared with a conventional fiber-reinforced composite material using a thermosetting resin and a reinforcing fiber; thus, it is possible to speed up the molding process of a structural member. Furthermore, by controlling the reactivity of the prepreg, it is possible to start the reaction from a low temperature with suppressing rapid heat generation, so that not only the molding time of the structural member can be shortened but also the dimensional accuracy of the resulting member can be improved. In addition, the laminate that exhibits an excellent bonding strength and is excellent as the structural material can be obtained; thus, when this is applied to an aircraft structural member, a wind turbine blade, an automotive structural member, and computer applications such as an IC tray and a housing of a laptop computer, this exhibits an excellent performance as the structural material, as well as it is possible to significantly reduce the molding time and cost of the products relating to the above-mentioned applications.

DETAILED DESCRIPTION OF EMBODIMENTS OF THE INVENTION

The reinforcing fiber of the composition element [A] used in embodiments of the present invention includes a glass fiber, a carbon fiber, a metal fiber, an aromatic polyamide fiber, a polyaramide fiber, an alumina fiber, a silicon carbide fiber, a boron fiber, a basalt fiber, and the like. These may be used singly or in a combination of two or more of them as appropriate. These reinforcing fibers may be surface treated. The surface treatment includes a metal deposition treatment, a treatment with a coupling agent, a treatment with a sizing agent, and an adhesion treatment with an additive, and the like. In this specification, in the case that such a surface treatment is conducted to the reinforcing fiber, the reinforcing fiber shall include those in the state after having been subjected to the treatments as described above. These reinforcing fibers include the reinforcing fiber having an electric conductivity. The carbon fiber is preferably used as the reinforcing fiber because of its low specific gravity, high strength, and high elastic modulus.

Illustrative examples of the commercially available product of the carbon fiber include TORAYCA (registered trademark) T800G-24K, TORAYCA (registered trademark) T800S-24K, TORAYCA (registered trademark) T700G-24K, TORAYCA (registered trademark) T700S-24K, TORAYCA (registered trademark) T300-3K, and TORAYCA (registered trademark) T1100G-24K (all are manufactured by Toray Industries, Inc.).

The form and arrangement of the reinforcing fiber can be selected as appropriate from the reinforcing fibers arranged in one direction, a laminate of the reinforcing fibers arranged in one direction, a woven fabric, and the like. However, in order to obtain a lightweight laminate having a higher level of durability, it is preferable in each prepreg that the reinforcing fibers be long fibers arranged in one direction (fiber bundle) or in the form of continuous fibers such as a woven fabric.

The reinforcing fiber bundle may be composed of a plurality of fibers in the same form or a plurality of fibers in different forms. The number of the reinforcing fibers that constitute one reinforcing fiber bundle is usually in the range of 300 to 60,000; but considering the manufacturing of the base material, the number is preferably in the range of 300 to 48,000, while more preferably from 1,000 to 24,000. The range may be a combination of any of the upper limits and any of the lower limits described above.

In the reinforcing fiber of the composition element [A], a strand tensile strength thereof, measured in accordance with the resin-impregnated strand test method of JIS R7608 (2007), is preferably 5.5 GPa or greater, because the laminate having, in addition to a tensile strength, an excellent bonding strength can be obtained. The strand tensile strength is more preferably 5.8 GPa. The bonding strength here refers to the tensile shear adhesion strength obtained in accordance with ISO 4587:1995 (JIS K6850 (1994)).

The reinforcing fiber of the composition element [A] has a surface free energy of preferably in the range of 10 to 50 mJ/m² as measured by the Wilhelmy method. By controlling the surface free energy within this range, the reinforcing fiber expresses a high affinity with the thermosetting resin of [B] or with the thermosetting resin cured product of [D] and the thermoplastic resin of [C], and a high bonding strength at the boundary surface between a resin region containing [B] or [D] and a resin region containing [C] through which the reinforcing fiber exists is obtained. In addition, agglomeration of the reinforcing fibers among themselves is suppressed thereby resulting in good dispersion of the reinforcing fibers in the molded article and in less variation (coefficient of variation) in the bonding strength. The surface free energy of the reinforcing fiber is preferably in the range of 15 to 40 mJ/m², while more preferably in the range of 18 to 35 mJ/m².

The method to control the surface free energy of the reinforcing fiber includes the method in which an amount of an oxygen-containing functional group such as a carboxyl group and a hydroxyl group is controlled by oxidizing the surface thereof, or the method in which a single compound or a plurality of compounds is attached to the surface thereof. When a plurality of compounds is attached to the surface, a mixture of compounds having a high surface free energy and a low surface free energy may be attached. Hereinafter, the method to calculate the surface free energy of the reinforcing fiber will be explained. The surface free energy can be calculated by measuring the contact angle between the reinforcing fiber and each of three solvents (purified water, ethyleneglycol, and tricresyl phosphate) followed by the Owens' approximation method. The procedure is described below, but the measurement equipment and the detailed method thereof are not necessarily limited to the following.

By using DCAT11 manufactured by DataPhysics, firstly, after taking one monofilament out from the reinforcing fiber bundle, this is cut into eight fibers having the length of 12±2 mm, and then these are attached in parallel to a specialized holder FH12 (a flat plate whose surface is coated with an adhesive substance) with the distance of 2 to 3 mm between the monofilaments. The tips of the monofilaments are then trimmed and set in DCAT11 of the holder. For the measurement, a cell containing each solvent is brought close to the lower tips of the eight monofilaments at the speed of 0.2 mm/s and immersed to 5 mm from the tip of the monofilaments. Then, the monofilaments are pulled up at the speed of 0.2 mm/s. This operation is repeated four or more times. The force F received by the monofilament while being immersed in the liquid is measured using an electronic balance. This value is used to calculate the contact angle θ by the following equation.

COS θ=(force $F$ (mN) received by 8 monofilaments)/(8 (number of monofilaments)×circumference of monofilament (m)×surface tension of solvent (mJ/m²))

The measurement was carried out with regard to the monofilaments extracted from three different locations of the reinforcing fiber bundle. That is, the average contact angle for a total of 24 monofilaments in one reinforcing fiber bundle was calculated.

The surface free energy of the reinforcing fiber $\gamma_f$ is calculated as the sum of the surface free energy of the polar component $\gamma^p_f$ and the surface free energy of the nonpolar component $\gamma^d_f$.

The surface free energy of the polar component $\gamma^p_f$ can be calculated as follows: by substituting the components of the surface tension and the contact angle of each liquid into the Owens' approximation formula (which is composed of the polar and the non-polar components of the surface tension specific to each solvent and the contact angle θ) and plotting them on X and Y, and then, by using the least square method to approximate a straight line, the value is obtained from the square of the slope a. The surface free energy of the nonpolar component $\gamma^d_f$ can be obtained by the square of the intercept b. The surface free energy of the reinforcing fiber $\gamma_f$ is the sum of the square of the slope a and the square of the intercept b.

$Y = a \cdot X + b$ $X = \sqrt{\text{(polar component of solvent surface tension (mJ/m}^2\text{))}}/\sqrt{\text{(non-polar component of solvent surface tension (mJ/m}^2\text{))}}$ $Y = (1 + \cos \theta)/(\text{polar component of solvent surface tension (mJ/m}^2\text{))}/2\sqrt{\text{(non-polar component of solvent surface tension (mJ/m}^2\text{))}}$ Polar component of the surface free energy of reinforcing fiber $\gamma^p_f = a^2$ Non-polar component of the surface free energy of reinforcing fiber $\gamma^d_f = b^2$ Total surface free energy $\gamma_f = a^2 + b^2$ The polar and the non-polar components of the surface tension of each solvent are as follows.

Purified Water
Surface tension 72.8 mJ/m²; polar component 51.0 mJ/m² and non-polar component 21.8 (mJ/m²)
Ethyleneglycol
Surface tension 48.0 mJ/m²; polar component 19.0 mJ/m² and non-polar component 29.0 (mJ/m²)
Tricresol Phosphate
Surface tension 40.9 mJ/m², polar component 1.7 mJ/m² and non-polar component 39.2 (mJ/m²)

Figure 3:
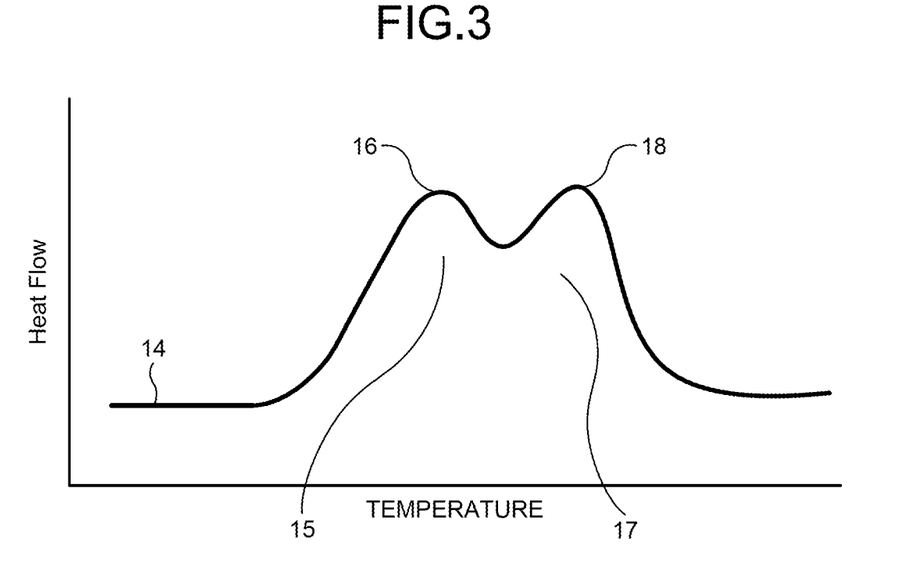
FIG. 3 is a schematic diagram of the chart from the differential scanning calorimetry analysis in an embodiment of the present invention, and is for the sake of explanation about the method to measure the apexes of a first and a second small exothermic peak.

In the prepregs according to embodiments of the present invention, the full width at half maximum of the peak appearing as the exothermic reaction when measured with a differential scanning calorimetry analysis under an inert gas atmosphere at a temperature raising rate of 5° C./min, is preferably in the range of 50° C. to 100° C. both inclusive. When the full width at half maximum of the peak is in the range of 50° C. to 100° C. both inclusive, the rapid exothermic reaction and thus an excessive heat storage inside the laminate can be suppressed, so that the uneven rate of reaction in the thermosetting resin can be minimized; thus, the laminate having an excellent dimensional accuracy can be obtained. In addition, molding of the laminate can be completed in a short time. More preferably, the full width at half maximum of the peak appearing as the exothermic reaction is in the range of 70° C. to 100° C. both inclusive. The exothermic peak has two or more peaks in its curve (hereinafter these peaks are referred to as "small exothermic peaks"). The first small exothermic peak has its apex in the temperature range of 150° C. to 180° C. both inclusive, and the second small exothermic peak has its apex in the temperature range of 185° C. to 220° C. both inclusive; then, the difference in the temperature between the apexes of these two small exothermic peaks is preferably in the range of 20° C. to 50° C. both inclusive. FIG. 3 is a schematic diagram of the chart having the first and the second small exothermic peaks in the differential scanning calorimetry analysis. In a chart 14 in FIG. 3, a first small exothermic peak 15 has an apex 16 and a second small exothermic peak 17 has an apex 18. When the apex 16 of the first small exothermic peak 15 is in the temperature range of 150° C. to 180° C. both inclusive, the molding time of the laminate can be shortened, and when the apex 18 of the second small exothermic peak 17 is in the temperature range of 185° C. to 220° C. both inclusive and the difference in the temperature between the apexes of these two small exothermic peaks is in the range of 20° C. to 50° C. both inclusive, the rapid heat generation due to the reaction can be suppressed, so that the laminate having a high dimensional accuracy can be obtained.

The thermosetting resin cured product of the composition element [D] in the laminate according to embodiments of the present invention is typically a thermally cured thermosetting resin of the composition element [B] in the prepreg according to embodiments of the present invention. The temperature condition for the thermal curing may be set appropriately in accordance with the thermosetting resin, the curing agent, and the curing accelerator including the kinds and amounts thereof. For example, when an epoxy resin is included as the thermosetting resin and diaminodiphenyl sulfone as the amine compound, the heating condition of 180° C. for 2 hours may be preferably used, and when dicyandiamide is used as the curing agent, the heating condition of 135° C. for 2 hours may be preferably used.

Illustrative examples of the thermosetting resin ("thermosetting resin" as the composition element [B] in this specification shall mean a resin composition that contains more than 50% by mass of the thermosetting resin and exhibits the behavior of the thermosetting resin as a whole) to be used in the composition element [B] include an unsaturated polyester resin, a vinyl ester resin, an epoxy resin, a phenol resin, a urea resin, a melamine resin, a polyimide resin, a cyanate ester resin, a bismaleimide resin, a benzoxazine resin, a copolymer or a modified body of these resins, or a blend of at least two of these resins. In order to improve the impact resistance, an elastomer or a rubber component may be added to the thermosetting resin. Among these, an epoxy resin is preferable because of its excellent mechanical properties, heat resistance, and adhesion to the reinforcing fiber. Illustrative examples of the main component of the epoxy resin include bisphenol epoxy resins such as a bisphenol A epoxy resin, a bisphenol F epoxy resin, a bisphenol AD epoxy resin, a bisphenol S epoxy resin, and a brominated epoxy resin such as a tetrabromobisphenol A diglycidyl ether, an epoxy resin having a biphenyl skeleton, an epoxy resin having a naphthalene skeleton, an epoxy resin having a dicyclopentadiene skeleton, novolac epoxy resins such as a phenol novolac epoxy resin and a cresol novolac epoxy resin, N,N,O-triglycidyl-m-aminophenol, N,N,O-triglycidyl-p-aminophenol, N,N,O-triglycidyl-4-amino-3-methylphenol, N,N,N',N'-tetraglycidyl-4,4'-methylenedianiline, glycidylamine epoxy resins such as N,N,N',N'-tetraglycidyl-2,2'-diethyl-4,4'-methylenedianiline, N,N,N',N'-tetraglycidyl-m-xylylenediamine, N,N-diglycidylaniline, and N,N-diglycidyl-o-toluidine, resorcinol diglycidyl ether, and triglycidyl isocyanurate.

It is preferable that the thermosetting resin of the composition element [B] include an epoxy resin. By including 40 to 100 parts by mass of a glycidylamine epoxy resin having 3 or more glycidyl groups relative to 100 parts by mass of the total epoxy resins contained in the thermosetting resin, the cured product having a high heat resistance can be obtained; so, this embodiment is more preferable. Illustrative examples of the glycidylamine epoxy resin containing 3 or more glycidyl groups include N,N,O-triglycidyl-m-aminophenol, N,N,O-triglycidyl-p-aminophenol, N,N,O-triglycidyl-4-amino-3-methylphenol, N,N,N',N'-tetraglycidyl-4,4'-methylenedianiline, N,N,N',N'-tetraglycidyl-2,2'-diethyl-4,4'-methylenedianiline, and N,N,N',N'-tetraglycidyl-m-xylylenediamine.

The composition element [B] according to embodiments of the present invention contains at least two types of curing agents. Hereinafter, these two curing agents are referred to as a first curing agent [b1] and a second curing agent [b2]. In the present invention, preferably, the first curing agent [b1] is an amine compound having neither a carbonyl group nor a sulfinyl group, and the second curing agent [b2] is a carboxylic acid hydrazide or an aromatic amine having a carbonyl group or a sulfinyl group. Hereinafter, this embodiment will be explained.

The first curing agent [b1] of the epoxy resin is preferably an aromatic amine curing agent having neither a carbonyl group nor a sulfinyl group. By using the aromatic amine curing agent having neither a carbonyl group nor a sulfinyl group as the first curing agent [b1], the epoxy resin having an excellent heat resistance can be obtained. Illustrative examples of the aromatic amine compound include 3,3'-diisopropyl-4,4'-diaminodiphenylsulfone, 3,3'-di-t-butyl-4,4'-diaminodiphenylsulfone, 3,3'-diethyl-5,5'-dimethyl-4,4'-diaminodiphenylsulfone, 3,3'-diisopropyl-5,5'-dimethyl-4,4'-diaminodiphenylsulfone, 3,3'-di-t-butyl-5,5'-dimethyl-4,4'-diaminodiphenylsulfone, 3,3',5,5'-tetraethyl-4,4'-diaminodiphenylsulfone, 3,3'-diisopropyl-5,5'-diethyl-4,4'-diaminodiphenylsulfone, 3,3'-di-t-butyl-5,5'-diethyl-4,4'-diaminodiphenylsulfone, 3,3',5,5'-tetraisopropyl-4,4'-diaminodiphenylsulfone, 3,3'-di-t-butyl-5,5'-diisopropyl-4,4'-diaminodiphenylsulfone, 3,3',5,5'-tetra-t-butyl-4,4'-diaminodiphenylsulfone, 4,4'-diaminodiphenylsulfone, and 3,3'-diaminodiphenylsulfone.

In addition, containing the carboxylic acid hydrazide or the aromatic amine having a carbonyl group or a sulfinyl group as the second curing agent [b2] of the epoxy resin is preferable because the exothermic behavior can be controlled for the desirable prepreg molding. In addition, these curing agents exhibit a strong interaction with the thermoplastic resin of the composition element [C] due to the hydrogen bonding property of the hydrazide structure, the carbonyl group, or the sulfinyl group, so that the interface strength between the resin region containing [B] or [D] and the resin region containing [C] is enhanced, resulting in the excellent bonding strength as the integrated product. As for the second curing agent [b2], it is more preferable to use the carboxylic acid hydrazide in view of a high shortening effect of the molding time (fast curing) and expression of a high dimensional accuracy.

Illustrative examples of the carboxylic acid hydrazide include 3-hydroxy-2-naphthoic acid hydrazide, 2,6-naphthalenedicarbodihydrazide, salicylic acid hydrazide, terephthalic acid dihydrazide, and dihydrazide isophthalate.

Illustrative examples of the aromatic amine having a carbonyl group used as the second curing agent [b2] include 4,4'-diaminodiphenyl ketone, 4,4'-diamino-3,3',5,5'-tetraethyldiphenyl ketone, 4,4'-diamino-3,3',5,5'-tetrabromodiphenyl ketone, 3,4'-diaminodiphenyl ketone, 3,3'-diaminodiphenyl ketone, 4,4'-diamino-2,2'-dimethyldiphenyl ketone, 4,4'-diamino-2,3'-dimethyldiphenyl ketone, 4,4'-diamino-3,3'-dimethyldiphenyl ketone, 3,4'-diamino-5-methyldiphenyl ketone, 3,4'-diamidino-2'-methyldiphenyl ketone, 3,4'-diamidino-3'-methyldiphenyl ketone, 3,4'-diamino-5,2'-dimethyldiphenyl ketone, 3,4'-diamino-5,3'-dimethyldiphenyl ketone, 3,3'-diamino-5-methyldiphenyl ketone, and 3,3'-diamino-5,5'-dimethyldiphenyl ketone.

Illustrative examples of the aromatic amine having a sulfinyl group used as the second curing agent [b2] include 4,4'-diaminodiphenyl sulfoxide, 4,4'-diamino-3,3',5,5'-tetraethyldiphenyl sulfoxide, 4,4'-diamino-3,3',5,5'-tetrabromodiphenyl sulfoxide, 3,4'-diaminodiphenyl sulfoxide, 3,3'-diaminodiphenyl sulfoxide, 4,4'-diamino-2,2'-dimethyldiphenyl sulfoxide, 4,4'-diamino-2,3'-dimethyldiphenyl sulfoxide, 4,4'-diamino-3,3'-dimethyldiphenyl sulfoxide, 3,4'-diamino-5-methyldiphenyl sulfoxide, 3,4'-diamino-2'-methyldiphenyl sulfoxide, 3,4'-diamino-3'-methyldiphenyl sulfoxide, 3,4'-diamino-5,2'-dimethyldiphenyl sulfoxide, 3,4'-diamino-5,3'-dimethyldiphenylsulfoxide, 3,3'-diamino-5-methyldiphenylsulfoxide, and 3,3'-diamino-5,5'-dimethyldiphenyl sulfoxide.

In the prepreg and the laminate according to embodiments of the present invention, the ratio of the first curing agent [b1] to the second curing agent [b2] is preferably 0.05≤mole number of [b2]/mole number of [b1]≤2.0, because with this, the molding time of the laminate can be shortened while suppressing the rapid heat generation caused by the reaction, and in addition, the laminate having a high dimensional accuracy can be obtained. The ratio is more preferably, 0.05≤mole number of [b2]/mole number of [b1]≤1.0, while still more preferably 0.05≤mole number of [b2]/mole number of [b1]≤0.4.

The thermosetting resin of the composition element [B] according to embodiments of the present invention may contain other curing agent or curing accelerator, although the first curing agent [b1] and the second curing agent [b2] are the main components as the curing agent. It is preferable that the total mass of [b1] and [b2] relative to the total mass of curing agents and curing accelerators contained in the thermosetting resin of [B] be 80% or more. Illustrative examples of the other curing agent include an acid anhydride and a phenol novolac compound. Illustrative examples of the curing accelerator include phosphorus-based curing accelerators such as triphenylphosphine, a tetraarylphosphonium tetraarylborate, a cationic polymerization initiator, a tertiary amine, an imidazole compound, and a urea compound.

In addition, it is preferable that the thermosetting resin of the composition element [B] contain, as a viscosity controller, a thermoplastic resin component that is soluble in the thermosetting resin in the state of being dissolved therein. The thermoplastic resin component described above is a thermoplastic resin component other than the composition element [C]. The term "soluble in the thermosetting resin" means that there is a temperature range in which the thermoplastic resin component being mixed with the thermosetting resin forms a homogeneous phase upon heating or heating with stirring. Here, the term "forming a homogeneous phase" means that there is no separation by a visual observation. The term "state of being dissolved" refers to the state in which the thermosetting resin including the thermoplastic resin component is in a homogeneous phase in a certain temperature range. Once a homogeneous phase is formed in a certain temperature range, it does not matter whether or not separation occurs outside this temperature range, for example, at room temperature.

The thermoplastic resin component that is soluble in the thermosetting resin of the composition element [B] is preferably the thermoplastic resin generally having in the main chain thereof a bond selected from the group consisting of a carbon-carbon bond, an amide bond, an imide bond, an ester bond, an ether bond, a carbonate bond, a urethane bond, a thioether bond, a sulfone bond, and a carbonyl bond. Also, the thermoplastic resin component may partially have a cross-linked structure; and also, this may be crystalline or amorphous. In particular, preferable is at least one resin selected from the group consisting of polyamide, polycarbonate, polyacetal, polyphenylene oxide, polyphenylene sulfide, polyarylate, polyester, polyamideimide, polyimide, polyetherimide, polyimide having a phenyl trimethylindane structure, polysulfone, polyether sulfone, polyether ketone, polyether ether ketone, polyaramide, polyvinyl formal, polyvinyl butyral, a phenoxy resin, polyether nitrile and polybenzimidazole. In order to obtain a good heat resistance, from a viewpoint of being less prone to cause thermal deformation when used as a molded article, the glass transition temperature thereof is preferably 150° C. or higher, while more preferably 170° C. or higher; so, polyetherimide and polyethersulfone are mentioned as preferable examples for this.

There is no particular restriction on the thermoplastic resin that constitutes the composition element [C] ("thermoplastic resin" as the composition element [C] herein means a resin composition that contains more than 50% by mass of the thermoplastic resin and exhibits the behavior of the thermoplastic resin as a whole); then, illustrative examples thereof include: polyester resins such as polyethylene terephthalate, polybutylene terephthalate, polytrimethylene terephthalate, polyethylene naphthalate, and a liquid crystal polyester; polyolefins such as polyethylene, polypropylene, and polybutylene; a styrene resin, a urethane resin, and polyoxymethylene; polyamides such as polyamide 6 and polyamide 66; polycarbonate, polymethyl methacrylate, polyvinyl chloride, polyphenylene sulfide, polyphenylene ether, a modified polyphenylene ether, polyimide, polyamideimide, polyetherimide, polysulfone, a modified polysulfone, and polyether sulfone; polyarylene ether ketones such as polyketone, polyether ketone, polyether ether ketone, and polyether ketone ketone; polyarylate, polyether nitrile, a phenolic resin, and a phenoxy resin. The thermoplastic resin may also be a copolymer or a modified version of the above-mentioned resins and/or a blend of two or more of them. Among these, from a viewpoint of heat resistance, the thermoplastic resin of the composition element [C] includes preferably one or two or more resins selected from polyarylene ether ketone, polyphenylene sulfide, and polyetherimide with the amount thereof being 60% or more by mass therein. An elastomer or a rubber component may be added to improve the impact resistance. In addition, other fillers and additives may be included as appropriate in accordance with the use and the like so far as such addition does not impair the purpose of the present invention. Illustrative examples thereof include an inorganic filler, a flame retardant, a conductive agent, a crystal nucleating agent, a UV absorber, an antioxidant, a vibration-damping agent, an antibacterial agent, an insect repellent, an odor repellent, an anti-coloring agent, a heat stabilizer, a mold release agent, an antistatic agent, a plasticizer, a lubricant, a colorant, a pigment, a dye, a foaming agent, an antifoaming agent, and a coupling agent.

When the thermoplastic resin of the composition element [C] has one or more functional groups selected from any of an amide group, a carbonyl group, an imide group, and a sulfonyl group, the hydrogen bonding interaction with the resin region containing [B] or [D] increases, which is preferable because an excellent bonding strength of the integrated product is expressed. In particular, when the second curing agent [b2] contains the carboxylic acid hydrazide or the aromatic amine having a carbonyl group or a sulfinyl group, the hydrogen bonding interaction is further increased, so that the interface strength between the resin region containing [B] or [D] and the resin region containing

[C] is improved, resulting in the excellent bonding strength as the integrated product; thus, this is a more preferable embodiment.

In the prepreg according embodiments of to the present invention, there is a reinforcing fiber [A] that crosses over the boundary surface between the resin region containing [B] and the resin region containing [C] and is in contact with both the resin regions. When there is the reinforcing fiber [A] that crosses over the boundary surface between the resin region containing the composition element [B] and the resin region containing the composition element [C] and is in contact with both the resin regions, [A] chemically and/or physically bonds with [B] and [C]; thus, this causes exfoliation of the resin region containing [B] from the resin region containing [C] to be difficult, leading to the increase in the bonding strength. The chemical and/or physical bonding of the composition element [A] on the boundary surface with the composition element [B] and the composition element [C] improves the adhesion of the resin region containing the composition element [B] with the resin region containing the composition element [C].

Figure 1:
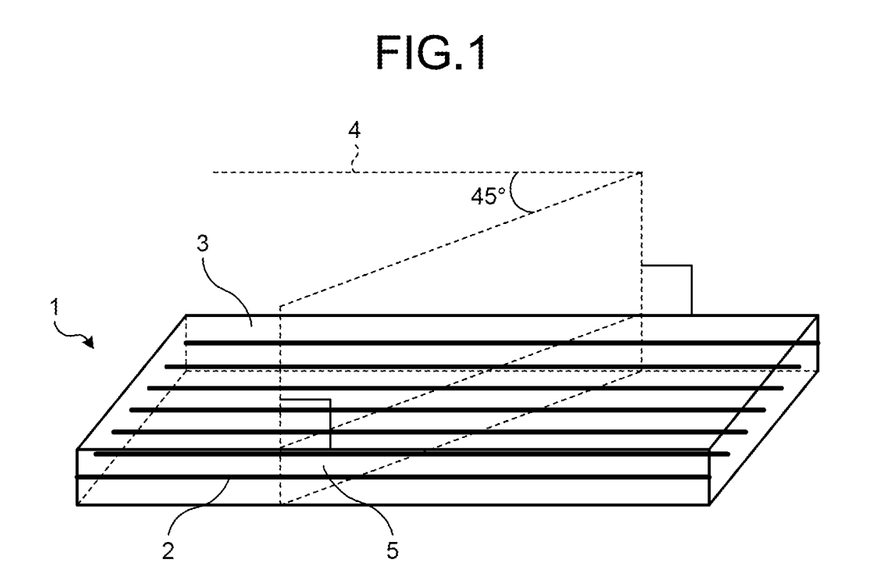
FIG. 1 is a schematic diagram of the prepreg or the laminate according to an embodiment of the present invention, and illustrates a cross section that is perpendicular to the prepreg plane or the laminate plane relating to FIG. 2.

In the prepreg according to the present invention, it is preferable that the resin region containing [B] and the resin region containing [C] be layered adjacent to each other. FIG. 1 is a schematic diagram of the prepreg or the laminate according to embodiments of the present invention, and FIG. 2 is a schematic diagram of a cross section that is perpendicular to the prepreg plane or the laminate plane, described in FIG. 1 as a cross section observation surface 5, and is for the sake of explanation about the method to measure the roughness average length RSm and the roughness average height Rc.

Figure 2:
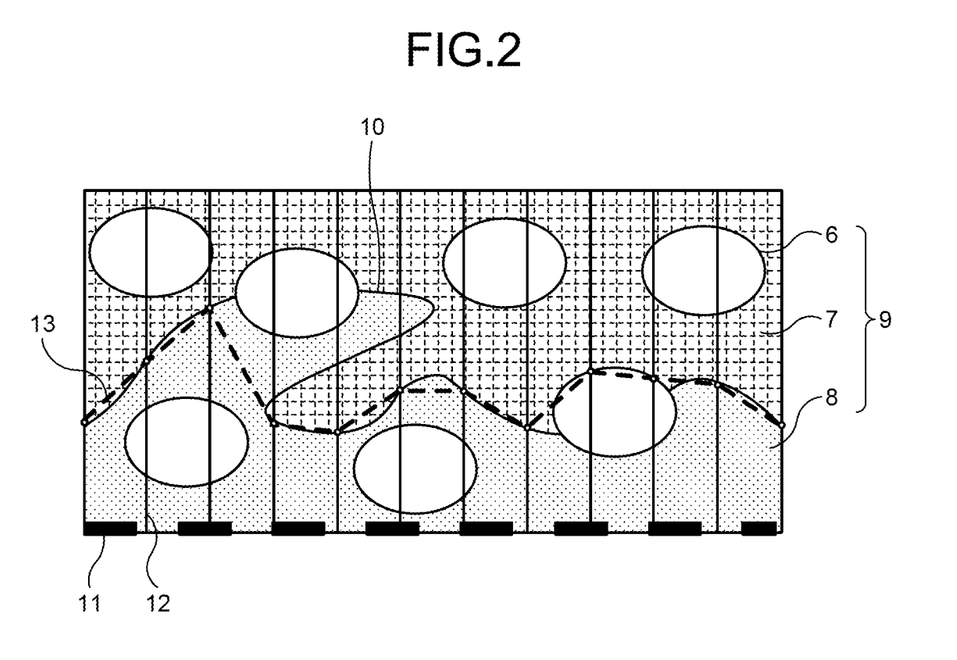
FIG. 2 is a schematic diagram of a cross section that is perpendicular to the prepreg plane or the laminate plane in an embodiment of the present invention, and is for the sake of explanation about the method to measure the roughness average length RSm and the roughness average height Rc.

In the prepreg according to embodiments of the present invention, layered and adjacent means the state in which, for example, as illustrated in FIG. 2, a resin region 7 containing [C] and a resin region 8 containing [B], which are continuous in the plane direction, exist in close contact with each other while forming a boundary surface 10 in the cross section obtained by cutting perpendicularly to the prepreg plane direction. When the resin region 7 containing [C] is not in a layered and continuous state, but exists in a particulate, a fibrous, an unwoven, or other form, the ratio of the area where the thermosetting resin of [B] is exposed on the surface increases and the covering rate of [C] on the outermost surface decreases, so that the welding property tends to be lowered.

Furthermore, when the prepreg is viewed in plane, from a direction that differs by an angle of 45 degrees, regardless of whether clockwise or counterclockwise, to the fiber direction of any fiber [A] in contact with both the resin regions, a cross section perpendicular to the prepreg plane containing the fiber [A] that crosses over both the resin regions is obtained. In this cross section, namely, the cross section obtained by cutting or the like perpendicularly to the plane direction of the prepreg, a roughness average length RSm of 100 µm or less and a roughness average height Rc of 3.5 µm or more are preferable in order to improve the bonding strength, where these length and height are of a cross section curve formed by the boundary of the two resins and are defined by JIS B0601 (2001). The roughness average height Rc is more preferably 10 µm or more.

When the roughness average length RSm is 100 µm or less, not only the chemical and/or physical bonding force but also the mechanical bonding force of interlocking makes it difficult for the resin region containing the composition element [B] and the resin region containing the composition element [C] to be exfoliated from each other. The lower limit thereof is not particularly restricted; but from the viewpoint of avoiding a decrease in the mechanical bonding strength due to stress concentration, this is preferably 15 µm or more. In addition, when the roughness average height Rc of the cross section curve is 3.5 µm or higher, not only the mechanical bonding force due to interlocking is expressed, but also the composition element [A] on the boundary surface chemically and/or physically bonds with the composition element [B] and the composition element [C], so that the adhesion of the resin region containing the composition element [B] with the resin region containing the composition element [C] is improved. The preferable range of the roughness average height Rc of the cross sectional curve is 10 µm or more; with this, the composition element [A] is more easily included in both the resin regions, thereby enhancing the adhesion furthermore. This is especially preferable when this is 20 µm or more. The upper limit thereof is not particularly restricted; but from the viewpoint of avoiding a decrease in the mechanical bonding strength due to stress concentration, this is preferably 100 µm or less.

For the measurement of the roughness average height Rc and the roughness average length RSm of the cross section curve, known methods may be used. For example, after the composition element [B] is cured, the measurement may be made from the cross section image obtained by using an X-ray CT, from the elemental analysis mapping image obtained by using an energy dispersive X-ray spectrometer (EDS), or from the cross section observation image obtained by using an optical microscope, a scanning electron microscope (SEM), or a transmission electron microscope (TEM). In these observations, the composition element [B] and/or the composition element [C] may be stained to adjust the contrast. In the image obtained by any of the above methods, the roughness average height Rc and the roughness average length RSm of the cross section curve are measured in the area of a 500 µm square.

An example of the method for measuring the roughness average height Rc and the roughness average length RSm of the cross section curve is illustrated in FIG. 2. In an observed image 9 illustrated in FIG. 2, the resin region 7 containing the composition element [C] is in close contact with the resin region 8 containing the composition element [B]; and this is illustrated as the boundary surface 10 in the observed image 9. A plurality of the composition elements [A] 6 is present on the boundary surface 10.

An example of the method for measuring the roughness average height Rc and the roughness average length RSm of a cross section curve 13 (measurement method 1 of the cross section curve element) is described below. The edge on the side of the resin region containing the composition element [B] in a rectangular observed image 9 is used as a baseline 11; then, perpendicular baselines 12 are drawn with the interval of 5 µm from the resin region 8 containing the composition element [B] to the resin region 7 containing the composition element [C]. The point where the perpendicular baseline 12 drawn from the baseline 11 intersects the composition element [C] for the first time is plotted, and the line connecting these plotted points is used as the cross section curve 13. The obtained cross section curve 13 is subjected to the filtering process based on JIS B0601 (2001) to calculate the roughness average height Rc and the roughness average length RSm of the cross section curve 13.

In the prepreg according to the present invention, it is preferable that the basis weight of the thermoplastic resin of the composition element [C] be 10 g/m$^2$ or more. The basis weight of 10 g/m$^2$ or more is preferable, because this provides a sufficient thickness to express an excellent bonding strength. The basis weight of 20 g/m² is more preferable. Although the upper limit thereof is not particularly restricted, this is preferably 500 g/m² or less, because this amount of the thermoplastic resin is not too much relative to the reinforcing fiber, so that the laminate having excellent specific strength and specific modulus can be obtained. Here, the basis weight refers to the mass (g) of the composition element [C] included in 1 m² of the prepreg.

In the prepreg according to the present invention, the amount of the reinforcing fiber per unit area is preferably in the range of 30 to 2,000 g/m². When the amount of the reinforcing fiber is 30 g/m² or more, the number of the laminate films to obtain a predetermined thickness can be reduced in the laminate molding, so that the workability is likely to be improved. On the other hand, when the amount of the reinforcing fiber is 2,000 g/m² or less, the draping property of the prepreg is likely to be improved.

The content of the reinforcing fiber in the prepreg according to the present invention is preferably in the range of 30 to 90% by mass, more preferably in the range of 35 to 85% by mass, while still more preferably in the range of 40 to 80% by mass. The range may be a combination of any of the upper limits and any of the lower limits described above. When the content of the reinforcing fiber is 30% or more by mass, the amount of resin is not too much relative to the fiber; thus, the laminate's advantages of the excellent specific strength and of the specific modulus is likely to be obtained, and upon molding of the laminate, the amount of heat generated at the time of curing is unlikely to become excessively high. When the content of the reinforcing fiber is 90% or less by mass, the chance of poor impregnation of the resin is likely to be reduced thereby leading to the decrease in formation of the void in the resulting laminate.

Another aspect of the present invention is the laminate that is produced by the method in which the preform having at least some of the layers thereof composed of the prepreg according to present invention is cured by pressurizing and heating, namely, the laminate having at least some of the layers thereof composed of the cured product of the prepreg according to embodiments of the present invention; the preform being produced by laminating a plurality of the prepregs according to embodiments of the present invention, or by laminating the prepreg according to embodiments of the present invention with a prepreg other than the prepreg according to embodiments of the present invention. Here, illustrative examples of the method for heating and pressurizing include a press molding method, an autoclave molding method, a bag molding method, a wrapping tape method, and an internal pressure molding method.

Alternatively, still another aspect of the present invention is a laminate including layers containing composition elements [A], [C], and [D], in which a reinforcing fiber [A] that crosses over a boundary surface between a resin region containing [C] and a resin region containing [D] and is in contact with both the resin regions is present.

When the laminate is viewed in a plane, from a direction that differs by an angle of 45 degrees, regardless of whether clockwise or counterclockwise, to a fiber direction of any [A] in contact with both the resin regions, a cross section perpendicular to the plane of the laminate containing [A] that penetrates both the resin regions is obtained; in this cross section, namely, in the cross section that is obtained by cutting or the like perpendicularly to the plane direction of the laminate, the roughness average length RSm of 100 μm or less and the roughness average height Rc of 3.5 μm or more are preferable. Here, the length and height are of a cross section curve formed by a boundary surface of the two adhered resin regions and defined by JIS B0601 (2001). The roughness average height Rc is more preferably 10 μm or more. The lower limit of RSm and the upper limit of Rc are not particularly restricted; but from the concern of a decrease in the mechanical bonding strength due to stress concentration, it is preferable that RSm be 15 μm or more and Rc be 100 μm or less.

The roughness average height Rc and roughness average length RSm of the cross section curve may be obtained by the method similar to the measurement method used in the prepreg according to the present invention as described before.

Illustrative examples of the molding method of the laminate according to the present invention include a press molding method, an autoclave molding method, a bag molding method, a wrapping tape method, an internal pressure molding method, a hand layup method, a filament winding method, a pultrusion method, a resin injection molding method, and a resin transfer molding method.

In the laminate according to the present invention, it is preferable that the thermoplastic resin of the composition element [C] be present on the surface thereof. In other words, it is preferable that the layer containing [A], [C] and [D] be present as the outermost layer, and that [C] be exposed to the surface thereof. In addition, in the laminate according to the present invention, it is preferable that the composition element [C] be present both on the surface of and inside the laminate; namely, it is preferable to have the layer containing [A], [C], and [D] also as an inner layer. When the thermoplastic resin of the composition element [C] is present on the surface of the laminate, the laminate according to the present invention can weld the same or different members via the composition element [C]; on the other hand, when the thermoplastic resin of the composition element [C] is present also inside the laminate, an excellent interlaminar fracture toughness value ($G_{IIC}$) is obtained.

When the laminate according to the present invention is bonded by a certain heater to another member, namely, to a member of the same type as the member composing the laminate and/or a member of a different type (material to be welded) on the surface where [C] is present, especially the composition element [C] on the surface of the laminate, the integrated product having integrated (welded) with the laminate via the composition element [C] can be obtained. Illustrative examples of the different type of member (material to be welded) include a member made of a thermoplastic resin and a member made of a metallic material. The member made of the thermoplastic resin may contain a reinforcing fiber, a filler, and the like. There is no particular restriction on the integration method; here, illustrative examples thereof include a thermal welding, a vibration welding, an ultrasonic welding, a laser welding, a resistance welding, an induction welding, an insert injection molding, and an outsert injection molding.

The strength of the bonding portion of the integrated product can be evaluated in accordance with ISO 4587:1995 (JIS K6850 (1994)). The tensile shear adhesion strength measured in accordance with ISO 4587:1995 is preferably 25 MPa or more, while more preferably 28 MPa or more. In general, the laminate can be used for bonding of a structural material with the tensile shear adhesion strength of 20 MPa or greater, and the tensile shear adhesion strength here is higher than the tensile shear adhesion strength of a common adhesive measured under the testing ambient temperature of 23° C. (about 10 MPa). The higher the tensile shear adhesion strength, the better; so, there is no particular restriction on this, although the upper limit of the tensile shear adhesion strength of the integrated product of a normal laminate is 200 MPa.

The laminate according to the present invention is preferably used for an aircraft structural member, a wind turbine blade, an automotive exterior plate, computer applications such as an IC tray and a housing of a laptop computer, sporting goods such as a golf club shaft and a tennis racket, etc.

EXAMPLES

Hereinafter, the present invention will be described in detail by means of Examples. However, the scope of the present invention is not limited to these Examples. The unit "part" in the composition ratio means part by mass unless otherwise specifically noted. The measurement of various characteristics was performed under an ambient temperature of 23° C. and the relative humidity of 50% unless otherwise specifically noted.

Materials Used in Examples and Comparative Examples

The composition elements [A], [B], and [C] described below were used. The composition elements used in each Example and Comparative Example are listed in Tables 1 to 3.

Composition Element [A]: Reinforcing Fiber

After a common carbon fiber bundle as the raw material was obtained by the method described below, various compounds as the sizing agent were applied to the bundle to obtain the reinforcing fiber. First, acrylonitrile copolymer copolymerized with itaconic acid was spun and calcined to obtain the carbon fiber bundle having the total filament number of 24,000, the specific gravity of 1.8 g/cm$^3$, the strand tensile strength of 5.9 GPa, and the strand tensile modulus of 294 GPa. The various compounds as the sizing agent each were mixed with acetone to obtain a solution of about 1% by mass of the compound uniformly dissolved therein. After applying the compound to the carbon fiber bundle by the immersion method, this was heat-treated at 210° C. for 90 seconds in such a way as to control the amount of the compound adhered to the carbon fiber to 0.5 parts by mass relative to 100 parts by mass of the carbon fiber. The compounds used as the sizing agent for the carbon fiber as well as the surface free energies after application of the sizing agent are as follows.

CF1: Polyethylene glycol diglycidyl ether ("Denacol" (registered trademark) EX-841, manufactured by Nagase ChemteX Corp.)
Surface free energy: 20 mJ/m$^2$
CF2: Bisphenol A diglycidyl ether ("jER" (registered trademark) 828, manufactured by Mitsubishi Chemical Corp.)
Surface free energy: 9 mJ/m$^2$
CF3: Sorbitol polyglycidyl ether ("Denacol" (registered trademark) EX-614B, manufactured by Nagase ChemteX Corp.)
Surface free energy: 32 mJ/m$^2$
Composition Element [C]: Thermoplastic Resin
PA6: A film formed of polyamide 6 ("Amilan" (registered trademark) CM1007 (manufactured by Toray Industries, Inc.; melting point of 225° C. and glass transition temperature of 48° C.)) with the basis weight of 120 g/m$^2$
PPS: A film formed of polyphenylene sulfide ("Torelina" (registered trademark) A670T05 (manufactured by Toray Industries, Inc.; melting point of 278° C. and glass transition temperature of 90° C.)) with the basis weight of 120 g/m$^2$
PEKK1: A film formed of polyether ketone ketone ("KEPSTAN" (registered trademark) 6002 (manufactured by Arkema Inc.; melting point of 300° C. and glass transition temperature of 160° C.)) with the basis weight of 120 g/m$^2$
PEKK2: A film formed of polyether ketone ketone ("KEPSTAN" (registered trademark) 7002 (manufactured by Arkema Inc.; melting point of 331° C. and glass transition temperature of 162° C.)) with the basis weight of 120 g/m$^2$
PEEK: A film formed of polyether ether ketone (PEEK 450G (manufactured by Victrex plc; melting point of 343° C. and glass transition temperature of 143° C.)) with the basis weight of 120 g/m$^2$
Semi-aromatic PA: A film formed of polyamide 6T (melting point of 320° C. and glass transition temperature of 125° C.) with the basis weight of 120 g/m$^2$
PEI: A film formed of polyetherimide ("ULTEM" (registered trademark) 1010 (manufactured by SABIC; glass transition temperature of 217° C.) with the basis weight of 120 g/m$^2$
PEs: A film formed of polyester (Hytrel (registered trademark) 2551 (manufactured by DU PONT-TORAY CO., LTD.; melting point 164° C.) with the basis weight of 120 g/m$^2$ <Method for Measurement of Melting Point of Thermoplastic Resin>

The melting point of the thermoplastic resin was measured using a differential scanning calorimeter (DSC) In accordance with JIS K7121 (2012). In the case when a plurality of melting points were observed, such as in the case of a mixture, the highest melting point was used as the melting point of the thermoplastic resin.

<Preparation Method and Evaluation Method of Thermosetting Resin>

Thermosetting resins for each of the specific examples listed in Table 1 were prepared using the following compounds.
(1) Epoxy Resin
Tetraglycidyl diaminodiphenylmethane ("Araldite" (registered trademark) MY721, manufactured by Huntsman Advanced Materials, Inc.), epoxy equivalent of 113 (g/eq.), tetrafunctional glycidylamine epoxy resin
Bisphenol A epoxy resin ("jER" (registered trademark) 825, manufactured by Mitsubishi Chemical Corp.), epoxy equivalent of 175 (g/eq.)
(2) Aromatic Amine Compound (b1: First Curing Agent)
4,4'-Diamino diphenyl sulfone (Seika Cure S, manufactured by Wakayama Seika Kougyou Co., Ltd.)
(3) Carboxylic Acid Hydrazide (b2: Second Curing Agent)
Dihydrazide isophthalate (Otsuka Chemical Co., Ltd.)
(4) Aromatic Amine Having Carbonyl or Sulfinyl Group (b2: Second Curing Agent)
4,4'-Diamino diphenyl ketone
4,4'-Diamino diphenyl sulfoxide
(5) Viscosity Controller
Polyethersulfone (SUMIKAEXCEL (registered trademark) PES5003P, manufactured by Sumitomo Chemical Co., Ltd.)

(6) Preparation Method of Thermosetting Resin

An epoxy resin and a viscosity controller described in Table 1 were charged into a kneading machine, and then, they were heated and kneaded to dissolve the viscosity controller. Then, the temperature was lowered to 100° C. or less with continuing the kneading. A curing agent selected as appropriate from those listed in Table 1 was added, and the resulting mixture was stirred to obtain each of the thermosetting resins B-1 to B-7.

<Method of Forming Thermosetting Resin Cured Product>

The thermosetting resin prepared by the above method was charged into a molding machine; then, the temperature was raised from 30° C. to 180° C. with the rate of 1.5° C./min in a hot air dryer. After thermally cured at 180° C. for 120 minutes, the temperature was lowered to 30° C. with the rate of 2.5° C./min to obtain a plate-like cured resin having the thickness of 2 mm. From the thermosetting resin cured product thus obtained, the specific examples listed in Table 1 were evaluated using the methods described later.

<Method for Measurement of Glass Transition Temperature of Thermosetting Resin Cured Product>

From the cured resin plate prepared by the above method, a test specimen having the thickness of 12.7 mm and a length of 45 mm was cut out; then, the test specimen was dried at 60° C. in a vacuum oven for 24 hours. The storage modulus curve thereof was obtained by a dynamic viscoelasticity testing according to JIS K 7244-7 (2007); then, the value of the temperature at the intersection of the tangent line in the glass state and the tangent line in the transition state in the storage modulus curve was defined as the glass transition temperature. Here, the measurement was conducted with the temperature raising rate of 5° C./min and the frequency of 1 Hz.

<Preparation Method of Prepreg>

Prepregs were prepared by the following two methods. The composition elements used in Examples are described in Tables 2 and 3.

[I] The reinforcing fibers of the composition element [A] (basis weight of 193 g/m$^2$) was drawn to the reinforcing fiber sheet aligned in one direction with a continuous state, and while running in one direction, a resin sheet formed of the composition element [C] having the basis weight of 120 g/m$^2$ was placed on the continuous reinforcing fiber sheet and heated with an IR heater to melt the composition element [C] so as to adhere to the entire one surface of the continuous reinforcing fiber sheet. Then, this was pressurized with a nip roll whose surface temperature was kept at the melting point of the composition element [C] or lower to cool the impregnated fiber-reinforced sheet to obtain a fiber-reinforced resin intermediate. The thermosetting resin relating to the composition element [B] selected as described in Tables 2 and 3 was coated onto a release paper using a knife coater with the basis weight of 100 g/m$^2$ to prepare a thermosetting resin film; then, this thermosetting resin film was overlaid on the opposite side of the impregnated side of the intermediate impregnated with the composition element [C]. The prepreg [I] was obtained by impregnating the intermediate with the thermosetting resin with heating and pressurizing by means of a heat roll.

[II] The thermosetting resin relating to the composition element [B] selected as described in Tables 2 and 3 was coated onto a release paper using a knife coater with the basis weight of 50 g/m$^2$ to prepare a resin film. This resin film was overlaid on both sides of the reinforcing fibers (basis weight: 193 g/m$^2$) of the composition element [A] aligned in one direction; then, the prepreg [II] was obtained by impregnating the carbon fibers with the thermosetting resin with heating and pressurizing by means of a heat roll.

<Evaluation of Prepreg Reactivity>

(1) Differential Scanning calorimetry Analysis

Prepreg [I] prepared as described above was subjected to a differential scanning calorimeter under a nitrogen atmosphere with the temperature raising rate of 5° C./min to evaluate the reactivity thereof. The exothermic peak temperature and the full width at half maximum of the exothermic peak in the obtained exothermic curve were calculated. Here, the exothermic peak is defined as the peak that generates the heat of 50 mW/g or greater from the baseline.

(2) Evaluation of Rapid Curing by Viscoelasticity Measurement

The prepreg [I] prepared as described above was cut to the diameter of 25 mm; then, six of them were stacked to obtain the test sample. The obtained test sample was then subjected to the dynamic viscoelasticity measurement with the temperature raising rate of 1.5° C./min, in which the point at which the obtained storage modulus curve intersects with the loss modulus curve was defined as the point of gelation, and the time required from the start of the test at 40° C. to the gelation point was defined as the gelling time. From the measurement results, the evaluation was made as follows.

The time is shorter than 80 minutes: A

The time is 80 minutes or longer and shorter than 90 minutes: B

The time is 90 minutes or longer and shorter than 100 minutes: C

The time is 100 minutes or longer: D (Failure)

<Preparation Method of Laminate and Evaluation of Mechanical Properties>

(1) Measurement Method of Tensile Shear Adhesion Strength

Prepregs [I] and [II] prepared as described above were cut into predetermined size to obtain two sheets of prepreg [I] and six sheets of prepreg [II]. The preforms were prepared by stacking them to [0°/90°]$_{2s}$ (the symbol s indicates a mirror symmetry), in which the axial direction of the reinforcing fiber is defined as 0°, and the orthogonal direction to the axis is defined as 90°. At this time, the two outermost layers of both sides were laminated with prepreg [I], and both surface layers of the preform were formed so as to be the thermoplastic resin layers containing the composition element [C]. The preform was set in the press mold, and then pressurized and heated by using a press machine with the pressure of 0.6 MPa at 180° C. for 120 minutes with keeping the shape of the preform by using a jig or a spacer, if necessary, to obtain the laminate.

The resulting laminate was cut into two pieces having the width of 250 mm and the length of 92.5 mm with the 0° direction as the longitudinal direction of the specimen; then, they were dried in a vacuum oven for 24 hours. Next, two panels were overlapped as the width of 25 mm×the length of 12.5 mm with the 0° direction as the longitudinal direction; then, this was kept under the pressure of 3 MPa at the temperature above the melting point of the used thermoplastic resin of the composition element [C] by 20° C. for 1 minute thereby welding the overlapped surfaces to obtain the integrated product. The resulting integrated product was adhered with a tab in accordance with ISO 4587:1995 (JIS K6850 (1994)); then, this was cut with the width of 25 mm to obtain the specimen.

The specimen thereby obtained was dried in a vacuum oven for 24 hours, and then the tensile shear adhesion strength thereof was measured at an ambient temperature of 23° C. in accordance with ISO 4587:1995 (JIS K6850 (1994)).

The evaluation was made as follows on the basis of the measurement results. Results are listed in Tables 2 and 3.

The strength is 28 MPa or greater: A
The strength is 25 MPa or greater and less than 28 MPa: B
The strength is 20 MPa or greater and less than 25 MPa: C
The strength is less than 20 MPa: D (Failure)

(2) Measurement Method of Degree of Flatness (Dimensional Accuracy)

Prepregs [I] and [II] prepared as described above were cut into the size of 250 mm long and 125 mm wide to obtain two prepregs [I] and six prepregs [II]. Two sheets of the prepreg [I] were placed as the outermost layers on both sides and the prepregs (II) were interposed between them; thus, the total 8 sheets of the prepregs were stacked in such a way as to be all in the same direction as the reinforcing fiber direction to obtain a preform. At this time, the preform was arranged such that both surface layers were the thermoplastic resin layers containing the composition element [C]. The preform was set in the press mold, and then pressurized and heated by using a press machine with the pressure of 0.6 MPa at 180° C. for 120 minutes with keeping the shape of the preform by using a jig or a spacer, if necessary, to obtain the laminate.

The degree of flatness of the resulting laminate was evaluated in accordance with JIS B7513 (1992). Three of the four edge points of the resulting laminate were grounded on a precision surface plate, and the height of the remaining one point from the plate was obtained. The height of each of the four edge points of the laminate from the plate thereof was obtained by the above method, in which the point not grounded on the precision surface plate was made the one point as described above. This measurement was repeated in turn for all points; then, the highest value of the four heights from the surface plate was defined as the degree of flatness of the laminate. From the measurement results, the evaluation was made as follows. Results are listed in Tables 2 and 3.

The height is less than 5 mm: A
The height is 5 mm or more and less than 10 mm: B
The height is 10 mm or more and less than 15 mm: C
The height is 15 mm or more: D (Failure)

(3) Measurement Method of Interlaminar Fracture Toughness Value ($G_{IIC}$)

The prepreg [I] prepared above was cut to a predetermined size, and a total of 20 sheets thereof were stacked in such a way as to be in the same direction as the reinforcing fiber direction. Then, the preform was prepared by inserting a release film for pre-crack introduction at the position between the 10th and 11th sheets in the middle. The preform was set in the press mold, and then pressurized and heated by using a press machine with the pressure of 0.6 MPa at 180° C. for 120 minutes with keeping the shape of the preform by using a jig or a spacer, if necessary, to obtain the laminate.

From the resulting laminate, a rectangular specimen having the length of 150 mm and the width of 20 mm was cut out with the reinforcing fiber axis as the longitudinal direction of the specimen. Then, this was dried in a vacuum oven at 60° C. for 24 hours. The obtained test specimen was subjected to evaluation of the interlaminar fracture toughness value ($G_{IIC}$) at an ambient temperature of 23° C. in accordance with JIS K7086 (1993).

<Measurement of Roughness Average Length RSm and Roughness Average Height Rc in Prepreg and Laminate>

Using the prepreg [I] prepared above, an image was taken using an optical microscope with the magnification of 1000 times in the cross section obtained by cutting perpendicularly to the prepreg plane direction at the angle of 45 degrees, in the prepreg plane view, to any fiber direction in [A] that is in contact with both the resin regions described above. In the obtained image, when the reinforcing fibers exists on the boundary surface between the resin region containing [C] and the resin region containing [B] and also the reinforcing fibers are in contact with both the resin region containing [C] and the resin region containing [B], this was considered as the state in which there are "reinforcing fibers in contact with both resin regions across the boundary surface". In an arbitrary 500 μm square observation area in the obtained image, the roughness average length RSm and the roughness average height Rc were measured; these length and height being defined in JIS B0601 (2001) for the cross section curve element obtained by the measurement method 1 of the cross section curve element. In the case of the laminate, too, the laminate described in (1) Measurement Method of Tensile Shear Adhesion Strength was used; then, the image was taken using an optical microscope with the magnification of 1000 times in the observing cross section obtained by cutting perpendicularly to the plane direction, and the rest of the measurement was performed in the same manner as the case of the prepreg described above.

Preparation Method of Laminates in Examples 1 to 15 and Comparative Example 1

In Examples 1 to 15 and Comparative Example 1, laminates were prepared by the method described in (1) Measurement Method of Tensile Shear Adhesion Strength and in (2) Measurement Method of Degree of Flatness.

Preparation Method of Laminates in Example 16 and Comparative Examples 2 to 4

In Comparative Example 2, a polyamide 6 film ("Amilan" (registered trademark) CM1007 (manufactured by Toray Industries, Inc.)) with the basis weight of 50 g/m² was attached to both surfaces of the reinforcing fiber sheet arranged in plane in one direction; then, this was pressurized with heating at 250° C. to obtain the prepreg of a reinforcing carbon fiber with the basis weight of 193 g/m². The obtained prepreg was cut to a predetermined size; then, 8 sheets thereof were stacked to [0°/90°]$_{2s}$ or to the same direction for evaluations of the bonding strength and of the degree of flatness. Then, this was subjected to the pressure of 3 MPa by means of a press machine with heating at 250° C. for 10 minutes to obtain each laminate. From the obtained laminate, the bonding strength and the degree of flatness were measured by the method as described in Examples.

In Example 16, the prepreg [I] was cut to a predetermined size, and a total of 20 sheets thereof were stacked in such a way as to be in the same direction as the reinforcing fiber direction; and a release film for pre-crack introduction was inserted at the position between the 10th and 11th sheets in the middle to obtain a preform.

In Comparative Example 3, the prepreg [II] (not containing the composition element [C]) was cut to a predetermined size, laminated in the same manner as in Example 16, and then, a release film was inserted between the prepregs to obtain a preform.

In Comparative Example 4, polyamide particles (SP-500, manufactured by Toray Industries, Inc.) were evenly spread on one surface of the prepreg [II] (not containing composition element [C]) having been cut to a predetermined size such that the amount of the particles per unit area of prepreg might become 7 g/m². Then, in the same way as Example 5, after lamination, a release film was inserted to obtain a preform. In all of Example 16 and Comparative Examples 3 and 4, the obtained preform was pressurized by a press machine with a pressure of 0.6 MPa with heating at 180° C. for 120 minutes to obtain the prepreg; then, with the method described in Examples, the interlaminar fracture toughness value ($G_{IIC}$) thereof was evaluated.

TABLE 1

|  |  |  |  | B-1 | B-2 | B-3 | B-4 | B-5 | B-6 | B-7 |
|---|---|---|---|---|---|---|---|---|---|---|
| [B] Thermosetting resin | Thermosetting resin | Epoxy resin | Bisphenol A epoxy resin ("iER (registered trademark)" 825) | 100 | 100 | 100 | 50 | 50 | 50 | 100 |
|  |  |  | Tetraglycidyl diaminodiphenylmethane ("Araldite (registered trademark)" MY721) |  |  |  | 50 | 50 | 50 |  |
|  | [b1] First curing agent | Aromatic amine | 4,4'-Diamino diphenyl sulfone (Seika Cure S) | 28.3 | 23 | 24.8 | 37.5 | 42 | 13.9 | 35.4 |
|  | [b2] Second curing agent | Carboxylic acid hydrazide | Dihydrazide isophthalate | 5.4 |  |  | 4.8 | 1.4 | 23.2 |  |
|  |  | Aromatic amine having carbonyl or sulfinyl group | 4,4'-Diamino diphenyl ketone |  | 10.4 |  |  |  |  |  |
|  |  |  | 4,4'-Diamino diphenyl sulfoxide |  |  | 10 |  |  |  |  |
|  | Viscosity controller |  | Polyethersulfone (SUMIKAEXCEL (registered trademark) PES5003P) | 7 | 7 | 7 | 7 | 7 | 7 | 7 |
|  | mole number of [b2]/mole number of [b1] |  |  | 0.24 | 0.53 | 0.43 | 0.16 | 0.04 | 2.13 | 0.00 |
| Characteristics of thermosetting resin cured product |  |  | Glass transition temperature (° C.) | 178 | 183 | 181 | 194 | 196 | 168 | 178 |

TABLE 2

|  |  | Example 1 | Example 2 | Example 3 | Example 4 | Example 5 |
|---|---|---|---|---|---|---|
| Composition element [A]: Reinforcing fiber |  | CF1 | CF1 | CF1 | CF1 | CF1 |
| Composition element [B]: Thermosetting resin |  | B-1 | B-2 | B-3 | B-4 | B-5 |
| Composition element [C]: Thermoplastic resin |  | PA6 | PA6 | PA6 | PA6 | PA6 |
| Differential scanning calorimetry analysis | Full width at half maximum of exothermic peak (° C.) | 82 | 73 | 68 | 87 | 53 |
|  | First peak temperature (° C.) | 167 | 203 | 204 | 168 | 195 |
|  | Second peak temperature (° C.) | 199 | — | — | 204 | — |
|  | Difference in peak temperatures (° C.) | 32 | — | — | 36 | — |
| Prepreg | Reinforcing fiber straddling boundary surface and being in contact with two resin regions | Present | Present | Present | Present | Present |
|  | Roughness average length of boundary surface RSm (μm) | 46 | 45 | 45 | 47 | 43 |
|  | Roughness average height of boundary surface Rc (μm) | 21 | 22 | 22 | 22 | 24 |
| Laminate | Reinforcing fiber straddling boundary surface and being in contact with two resin regions | Present | Present | Present | Present | Present |
|  | Roughness average length of boundary surface RSm (μm) | 44 | 45 | 48 | 45 | 46 |
|  | Roughness average height of boundary surface Rc (μm) | 23 | 24 | 19 | 24 | 26 |
| Prepreg rapid curing | Gelling time (min.) | A 77 | B 81 | B 82 | A 79 | C 94 |
| Laminate characteristics | Tensile shear adhesion strength at 23° C. (MPa) | A 29.1 | A 29.2 | A 29.2 | A 29.8 | B 27.6 |
| Laminate dimensional accuracy | Degree of flatness (mm) | A 4.8 | B 6.2 | B 6.8 | A 4.1 | C 10.5 |
|  |  | Example 6 | Example 7 | Example 8 | Example 9 | Example 10 |
| Composition element [A]: Reinforcing fiber |  | CF1 | CF1 | CF1 | CF1 | CF1 |
| Composition element [B]: Thermosetting resin |  | B-6 | B-4 | B-4 | B-4 | B-4 |
| Composition element [C]: Thermoplastic resin |  | PA6 | PPS | PEKK1 | PEKK2 | PEEK |
| Differential scanning calorimetry analysis | Full width at half maximum of exothermic peak (° C.) | 91 | 87 | 87 | 87 | 87 |

TABLE 2-continued

|  |  |  |  |  |  |  |
|---|---|---|---|---|---|---|
| Prepreg | First peak temperature (° C.) | 153 | 168 | 168 | 168 | 168 |
|  | Second peak temperature (° C.) | 197 | 204 | 204 | 204 | 204 |
|  | Difference in peak temperatures (° C.) | 44 | 36 | 36 | 36 | 36 |
|  | Reinforcing fiber straddling boundary surface and being in contact with two resin regions | Present | Present | Present | Present | Present |
|  | Roughness average length of boundary surface RSm (μm) | 44 | 55 | 47 | 52 | 50 |
|  | Roughness average height of boundary surface Rc (μm) | 23 | 20 | 22 | 21 | 22 |
| Laminate | Reinforcing fiber straddling boundary surface and being in contact with two resin regions | Present | Present | Present | Present | Present |
|  | Roughness average length of boundary surface RSm (μm) | 45 | 54 | 44 | 52 | 50 |
|  | Roughness average height of boundary surface Rc (μm) | 25 | 20 | 23 | 19 | 19 |
| Prepreg rapid curing | Gelling time (min.) | A 62 | A 79 | A 79 | A 79 | A 79 |
| Laminate characteristics | Tensile shear adhesion strength at 23° C. (MPa) | A 30.8 | B 27.4 | A 28.5 | A 29.2 | A 29.2 |
| Laminate dimensional accuracy | Degree of flatness (mm) | C 12.3 | A 4.2 | A 4.0 | A 4.1 | A 4.3 |

TABLE 3

|  |  | Example 11 | Example 12 | Example 13 | Example 14 | Example 15 |
|---|---|---|---|---|---|---|
| Composition element [A]: Reinforcing fiber |  | CF1 | CF1 | CF1 | CF2 | CF3 |
| Composition element [B]: Thermosetting resin |  | B-4 | B-4 | B-4 | B-4 | B-4 |
| Composition element [C]: Thermoplastic resin |  | Semi-aromatic PA | PEI | PEs | PA6 | PA6 |
| Differential scanning calorimetry analysis | Full width at half maximum of exothermic peak (° C.) | 87 | 87 | 87 | 87 | 87 |
|  | First peak temperature (° C.) | 168 | 168 | 168 | 168 | 168 |
|  | Second peak temperature (° C.) | 204 | 204 | 204 | 204 | 204 |
|  | Difference in peak temperatures (° C.) | 36 | 36 | 36 | 36 | 36 |
| Prepreg | Reinforcing fiber straddling boundary surface and being in contact with two resin regions | Present | Present | Present | Present | Present |
|  | Roughness average length of boundary surface RSm (μm) | 49 | 55 | 47 | 46 | 47 |
|  | Roughness average height of boundary surface Rc (μm) | 23 | 20 | 21 | 20 | 22 |
| Laminate | Reinforcing fiber straddling boundary surface and being in contact with two resin regions | Present | Present | Present | Present | Present |
|  | Roughness average length of boundary surface RSm (μm) | 52 | 5 6 | 45 | 47 | 49 |
|  | Roughness average height of boundary surface Rc (μm) | 21 | 23 | 18 | 23 | 21 |
| Prepreg rapid curing | Gelling time (min.) | A 79 | A 79 | A 79 | A 79 | A 79 |
| Laminate characteristics | Tensile shear adhesion strength at 23° C. (MPa) | A 28.6 | A 29.0 | C 24.6 | C 24.5 | A 30.3 |
| Laminate dimensional accuracy | Degree of flatness (mm) | A 4.4 | A 4.4 | A 4.4 | A 4.2 | A 4.1 |
| Laminate characteristics | Interlaminar fracture toughness $G_{IIC}$ (KJ/m$^2$) | — | — | — | — | — |

|  |  | Example 16 | Comparative Example 1 | Comparative Example 2 | Comparative Example 3 | Comparative Example 4 |
|---|---|---|---|---|---|---|
| Composition element [A]: Reinforcing fiber |  | CF-1 | CF-1 | CF-1 | CF-1 | CF-1 |
| Composition element [B]: Thermosetting resin |  | B-1 | B-7 | — | B-1 | B-1 |
| Composition element [C]: Thermoplastic resin |  | PA6 | PA6 | PA6 | — | PA6 particle |
| Differential scanning calorimetry analysis | Full width at half maximum of exothermic peak (° C.) | 82 | 48 | — | 82 | 82 |
|  | First peak temperature (° C.) | 167 | 208 | — | 167 | 167 |
|  | Second peak temperature (° C.) | 199 | — | — | 199 | 199 |
|  | Difference in peak temperatures (° C.) | 32 | — | — | 32 | 32 |

TABLE 3-continued

| | | | | | | |
|---|---|---|---|---|---|---|
| Prepreg | Reinforcing fiber straddling boundary surface and being in contact with two resin regions | Present | Present | Absent | Absent | Absent |
| | Roughness average length of boundary surface RSm (μm) | 46 | 46 | — | — | — |
| | Roughness average height of boundary surface Rc (μm) | 21 | 22 | — | — | — |
| Laminate | Reinforcing fiber straddling boundary surface and being in contact with two resin regions | Present | Present | Absent | Absent | Absent |
| | Roughness average length of boundary surface RSm (μm) | 45 | 47 | — | — | — |
| | Roughness average height of boundary surface Rc (μm) | 23 | 21 | | | |
| Prepreg rapid curing | Gelling time (min.) | | D 105 | — | | |
| Laminate characteristics | Tensile shear adhesion strength at 23° C. (MPa) | | B 27.1 | B 26.9 | | |
| Laminate dimensional accuracy | Degree of flatness (mm) | | C 11.3 | D 16.4 | | |
| Laminate characteristics | Interlaminar fracture toughness $G_{IIC}$ (KJ/m²) | 3.9 | — | — | 0.9 | 2.5 |

Reference Signs List

1 Prepreg or laminate
2 Composition element [A]
3 Composition element [C], and composition element [B] or composition element [D]
4 Axial direction of any fiber bundle
5 Observing cross section
6 Composition element [A]
7 Resin region containing composition element [C]
8 Resin region containing composition element [B] or composition element [D]
9 Observation image
10 Boundary surface
11 Baseline
12 Perpendicular baseline
13 Cross section curve
14 Chart by differential scanning calorimetry analysis
15 First small exothermic peak
16 Apex of first small exothermic peak
17 Second small exothermic peak
18 Apex of second small exothermic peak

The invention claimed is:

1. A prepreg comprising composition elements [A], [B], and [C] described below, wherein:
[C] is present on a surface of the prepreg, [B] contains a first curing agent [b1] and a second curing agent [b2], and a reinforcing fiber [A] that crosses over a boundary surface between a resin region containing [B] and a resin region containing [C] and that is in contact with both resin regions is present:
[A] a reinforcing fiber,
[B] a thermosetting resin, and
[C] a thermoplastic resin,
wherein the first curing agent [b1] is diaminodiphenyl sulfone, and the second curing agent [b2] is dihydrazide isophthalate,
wherein a blending ratio of the first curing agent [b1] to the second curing agent [b2] satisfies 0.16≤mole number of [b2]/mole number of [b1]≤0.24,
wherein composition element [A] has a surface free energy of 20 to 50 mJ/m² as measured by a Wilhelmy method and is formed from a sizing agent selected from polyethylene glycol diglycidyl ether, bisphenol A diglycidyl ether and sorbitol polyglycidyl ether
wherein composition element [B] is tetraglycidyl diaminodiphenylmethane or bisphenol A epoxy resin,
wherein composition element [C] is a polyamide, polyether ketone ketone, polyether ether ketone, polyetherimide or polyphenylene sulfide.

2. The prepreg according to claim 1, wherein, when a cross section perpendicular to a plane of the prepreg including the [A] from a direction that differs by an angle of 45 degrees, in a plane view of the prepreg, to a fiber direction of any [A] in contact with both the resin regions is obtained, a roughness average length RSm is 100 μm or less and a roughness average height Rc is 3.5 μm or more; the length and the height being of a cross section curve formed by the boundary surface of both the resin regions in contact with each other in the cross section and being defined by JIS B0601 (2001).

3. The prepreg according to claim 1, wherein the resin region containing [B] and the resin region containing [C] are configured to form layers adjacent to each other to form the boundary surface.

4. The prepreg according to claim 1, wherein a chart by a differential scanning calorimetry analysis with a temperature raising rate of 5° C./min satisfies at least one of [1] and [2] described below:
[1] a full width at half maximum of an exothermic peak is in a range of 50° C. to 100° C. both inclusive, and
[2] the exothermic peak has two or more small exothermic peaks, a first small exothermic peak has an apex in a range of 150° C. to 180° C. both inclusive, a second small exothermic peak has an apex in a range of 185° C. to 220° C. both inclusive, and a temperature difference between the apexes of the two small exothermic peaks is in a range of 20° C. to 50° C. both inclusive.

5. A laminate comprising a cured product of the prepreg according to claim 1 that constitutes at least some of layers of the laminate.

6. A laminate comprising layers containing composition elements [A], [C], and [D] described below, wherein a reinforcing fiber [A] that crosses over a boundary surface between a resin region containing [C] and a resin region containing [D] and that is in contact with both resin regions is present:
[A] a reinforcing fiber;
[C] a thermoplastic resin; and

[D] a thermosetting resin cured product formed by curing a thermosetting resin that contains a first curing agent [b1] and a second curing agent [b2], wherein the first curing agent [b1] is diaminodiphenyl sulfone, and the second curing agent [b2] is dihydrazide isophthalate, wherein a blending ratio of the first curing agent [b1] to the second curing agent [b2] satisfies 0.16≤mole number of [b2]/mole number of [b1]≤0.24 wherein composition element [A] has a surface free energy of 20 to 50 mJ/m² as measured by a Wilhelmy method and is formed from a sizing agent selected from polyethylene glycol diglycidyl ether, bisphenol A diglycidyl ether and sorbitol polyglycidyl ether, wherein composition element [D] is tetraglycidyl diaminodiphenylmethane or bisphenol A epoxy resin, wherein composition element [C] is a polyamide, polyether ketone ketone, polyether ether ketone, polyetherimide or polyphenylene sulfide.

7. The laminate according to claim 6, wherein, when a cross section perpendicular to a plane of the laminate including the [A] from a direction that differs by an angle of 45 degrees, in a plane view of the laminate, to a fiber direction of any [A] in contact with both the resin regions is obtained, a roughness average length RSm is 100 μm or less and a roughness average height Rc is 3.5 μm or more; the length and the height being of a cross section curve formed by the boundary surface of both the resin regions in contact with each other in the cross section and being defined by JIS B0601 (2001).

8. The laminate according to claim 6, wherein the resin region containing [C] and the resin region containing [D] are layered adjacent to each other to form the boundary surface.

9. The laminate according to claim 6, wherein the composition element [C] is present at least one of on a surface and between the layers of the laminate.

10. An integrated product, wherein another member is integrated with the laminate according to claim 6 by bonding to a surface where the composition element [C] is present, the surface being a surface of the laminate.

* * * * *